US012668325B2

(12) United States Patent
Sugimoto et al.

(10) Patent No.: US 12,668,325 B2
(45) Date of Patent: Jun. 30, 2026

(54) REAR HUB THRU-AXLE FOR HUMAN POWERED VEHICLE

(71) Applicant: Shimano Inc., Sakai (JP)

(72) Inventors: Akinobu Sugimoto, Sakai (JP); Hiroshi Fujita, Sakai (JP); Yuki Sakagawa, Sakai (JP); Ryota Yamaguchi, Sakai (JP); Hayato Shimazu, Sakai (JP)

(73) Assignee: Shimano Inc., Osaka (JP)

( * ) Notice: Subject to any disclaimer, the term of this patent is extended or adjusted under 35 U.S.C. 154(b) by 356 days.

(21) Appl. No.: 18/112,686

(22) Filed: Feb. 22, 2023

(65) Prior Publication Data

US 2023/0286608 A1 Sep. 14, 2023

(30) Foreign Application Priority Data

Mar. 14, 2022 (DE) .......................... 102022202491.5

(51) Int. Cl.
| | |
|---|---|
| *B62K 25/02* | (2006.01) |
| *B60B 27/00* | (2006.01) |
| *B60B 27/02* | (2006.01) |
| *B60B 35/08* | (2006.01) |
| *B62J 43/30* | (2020.01) |
| *B62J 45/40* | (2020.01) |
| *B62J 45/42* | (2020.01) |
| *B62J 45/423* | (2020.01) |

(52) U.S. Cl.
CPC .......... *B62K 25/02* (2013.01); *B60B 27/0068* (2013.01); *B60B 27/023* (2013.01); *B60B 35/08* (2013.01); *B62J 43/30* (2020.02); *B62J 45/40* (2020.02); *B62J 45/42* (2020.02); *B62J 45/423* (2020.02)

(58) Field of Classification Search
CPC . B60B 27/026; B60B 27/023; B60B 27/0068; B60B 27/04; B60B 35/08; B60B 35/10; B62K 25/02; B62K 2025/025; B62J 43/20; B62J 43/30; B62J 45/40; B62J 45/413; B62J 45/423; B62J 45/42; B62M 9/125; B62M 9/10
See application file for complete search history.

(56) References Cited

U.S. PATENT DOCUMENTS

| | | | |
|---|---|---|---|
| 4,027,753 | A | 6/1977 | Lantz |
| 7,537,291 | B2 | 5/2009 | Hara |
| 7,731,214 | B2 | 6/2010 | Laird |

(Continued)

FOREIGN PATENT DOCUMENTS

| | | |
|---|---|---|
| DE | 10 2018 126 435 A1 | 5/2019 |
| JP | 6853161 B2 | 3/2021 |

*Primary Examiner* — Kip T Kotter
(74) *Attorney, Agent, or Firm* — Spencer Fane, LLP

(57) ABSTRACT

A rear hub thru-axle is provided for a human powered vehicle. The rear hub thru-axle is basically provided with a first axle portion and a second axle portion. The first axle portion has a first hollow interior passage defining a first interior dimension. The second axle portion has a second hollow interior passage defining a second interior dimension. The first axle portion is connected to the second axle portion in an axial direction with respect to the rear thru-axle. The first interior dimension of the first hollow interior passage is larger than the second interior dimension of the second hollow interior passage.

16 Claims, 5 Drawing Sheets

(56) References Cited

U.S. PATENT DOCUMENTS

| | | | |
|---|---|---|---|
| 7,753,454 B2 * | 7/2010 | Hara ...................... | B62K 25/02 |
| | | | 301/124.2 |
| 2004/0140709 A1 * | 7/2004 | Kanehisa .............. | B60B 27/023 |
| | | | 301/110.5 |
| 2016/0362160 A1 * | 12/2016 | Van Druten ............. | B62J 50/22 |
| 2019/0016414 A1 * | 1/2019 | Yang ....................... | G01P 3/486 |
| 2019/0353676 A1 * | 11/2019 | Nichols ................... | B62J 45/20 |
| 2020/0156739 A1 * | 5/2020 | Van Druten ............. | B62M 9/10 |
| 2020/0189690 A1 * | 6/2020 | Van Druten ........... | B62J 45/423 |
| 2021/0197631 A1 * | 7/2021 | Fagot-Revurat .... | B60C 23/0447 |
| 2022/0194509 A1 | 6/2022 | Navarro Baeza | |

* cited by examiner

REAR HUB THRU-AXLE FOR HUMAN POWERED VEHICLE

CROSS-REFERENCE TO RELATED APPLICATIONS

This application claims priority to German Patent Application No. 102022202491.5, filed on Mar. 14, 2022. The entire disclosure of German Patent Application No. 102022202491.5 is hereby incorporated herein by reference.

BACKGROUND

Technical Field

This disclosure generally relates to a rear hub thru-axle for a human powered vehicle.

Background Information

Generally, a wheel for a human-powered vehicle has a hub, a plurality of spokes and an annular rim. Basically, the hub has a hub axle and a hub body. The hub axle is non-rotatably mounted to a frame of the human-powered vehicle. The hub body is coaxially coupled to the hub axle so that the hub body is disposed radially outwardly with respect to the hub axle. Bearings are configured and arranged to rotatably support the hub body so that the hub body can freely rotate around the hub axle. In some human-powered vehicles, such as bicycles, the hub is provided with a drive portion for receiving a driving force to rotate the wheel in a driving direction. For example, the hub is provided with a sprocket support body that is rotatably disposed to the hub axle. The sprocket support body can be configured to support one or more sprockets for receiving a driving force. The sprocket support body is usually coupled to the hub body by a one-way clutch such that torque is transferred from the sprocket support body to the hub body in one direction. This type of sprocket support body is sometimes called a freewheel. Freewheels are used so that the human-powered vehicle can advance freely without any rotation of the pedals (i.e., during coasting). During coasting, the freewheel is considered to be in a state of freewheeling in which the wheel can freely rotate while the sprockets remain stationary.

SUMMARY

Generally, the present disclosure is directed to various features of a rear hub thru-axle for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a rear hub thru-axle is provided for a human powered vehicle. The rear hub thru-axle basically comprises a first axle portion and a second axle portion. The first axle portion has a first hollow interior passage defining a first interior dimension. The second axle portion has a second hollow interior passage defining a second interior dimension. The first axle portion is connected to the second axle portion in an axial direction with respect to the rear hub thru-axle. The first interior dimension of the first hollow interior passage is larger than the second interior dimension of the second hollow interior passage.

With the rear hub thru-axle according to the first aspect, larger components can be accommodated in the first hollow interior passage, while smaller components can be accommodated in the second hollow interior passage.

In accordance with a second aspect of the present disclosure, the rear hub thru-axle according to the first aspect is configured so that the first axle portion has a first axle length, the second axle portion has a second axle length, and the first axle length is larger than the second axle length.

With the rear hub thru-axle according to the second aspect, the interior area of the first axle portion can accommodate longer components.

In accordance with a third aspect of the present disclosure, the rear hub thru-axle according to the first aspect or the second aspect is configured so that the first axle portion has a first exterior surface defining a first exterior dimension, and the second axle portion has a second exterior surface defining a second exterior dimension, and the first exterior dimension is larger than the second exterior dimension.

With the rear hub thru-axle according to the third aspect, the first axle portion can be configured to be provided inside a hub body and the second axle portion can be configured to be provided inside a sprocket support body that is smaller than the hub body in a radial direction with respect to the axial direction.

In accordance with a fourth aspect of the present disclosure, the rear hub thru-axle according to any one of the first aspect to the third aspect is configured so that the first hollow interior passage of the first axle portion is configured to receive one of at least one battery and at least one electronic component, and the second hollow interior passage of the second axle portion is configured to receive the other of the at least one battery and the at least one electronic component.

With the rear hub thru-axle according to the fourth aspect, it is possible to provide one of at least one battery and at least one electronic component in the first hollow interior passage of the first axle portion, and provide the other of the at least one battery and the at least one electronic component in the second hollow interior passage.

In accordance with a fifth aspect of the present disclosure, the rear hub thru-axle according to the fourth aspect is configured so that the at least one electronic component includes at least one of a sensor and a wireless communication unit.

With the rear hub thru-axle according to the fifth aspect, it is possible to sense a condition of a hub and communicate the condition to a remote wireless communication unit without using wires.

In accordance with a sixth aspect of the present disclosure, the rear hub thru-axle according to any one of the first aspect to the fifth aspect further comprises an end cap removably attached to an open end of the first axle portion on an opposite side from the second axle portion.

With the rear hub thru-axle according to the sixth aspect, the interior area of the first hollow interior passage and the interior area of the second hollow interior passage can be easily accessed.

In accordance with a seventh aspect of the present disclosure, the rear hub thru-axle according to any one of the first aspect to the sixth aspect further comprises a frame attachment structure attached to the first axle portion at an opposite side from the second axle portion.

With the rear hub thru-axle according to the seventh aspect, the first axle portion of the rear hub thru-axle can be attached to a frame using the frame attachment structure.

In accordance with an eighth aspect of the present disclosure, the rear hub thru-axle according to the seventh aspect is configured so that the frame attachment structure includes a frame engagement portion and an attachment bolt threadedly coupled to the frame engagement portion.

With the rear hub thru-axle according to the eighth aspect, the rear hub thru-axle can be easily attached to and released from a frame by screwing and unscrewing the attachment bolt with respect to the frame engagement portion.

In accordance with a ninth aspect of the present disclosure, the rear hub thru-axle according to any one of the first aspect to the eighth aspect is configured so that the second axle portion has an exterior thread for threadedly engaging with a fixing nut, or a fork or a frame.

With the rear hub thru-axle according to the ninth aspect, the second axle portion of the rear hub thru-axle can be attached to a frame by threadedly engaging one of a fixing nut, or a fork or a frame.

In accordance with a tenth aspect of the present disclosure, a rear hub comprises a rear hub thru-axle according to any one of the first aspect to the ninth aspect, a hub body rotatably disposed around the first axle portion, and a sprocket support body rotatably disposed around the second axle portion.

With the rear hub according to the tenth aspect, the rear hub thru-axle can be used as a part of a rear hub body such that a hub body is rotatably provided around the first axle portion, while a sprocket support body is rotatably provided around the second axle portion.

Also, other objects, features, aspects and advantages of the disclosed rear hub thru-axle will become apparent to those skilled in the art from the following detailed description, which, taken in conjunction with the annexed drawings, discloses preferred embodiments of the rear hub thru-axle.

BRIEF DESCRIPTION OF THE DRAWINGS

Referring now to the attached Figures which form a part of this original disclosure.

DETAILED DESCRIPTION OF EMBODIMENTS

Selected embodiments will now be explained with reference to the drawings. It will be apparent to those skilled in the human-powered vehicle field (for example the bicycle field) from this disclosure that the following descriptions of the embodiments are provided for illustration only and not for the purpose of limiting the invention as defined by the appended claims and their equivalents.

Figure 1:
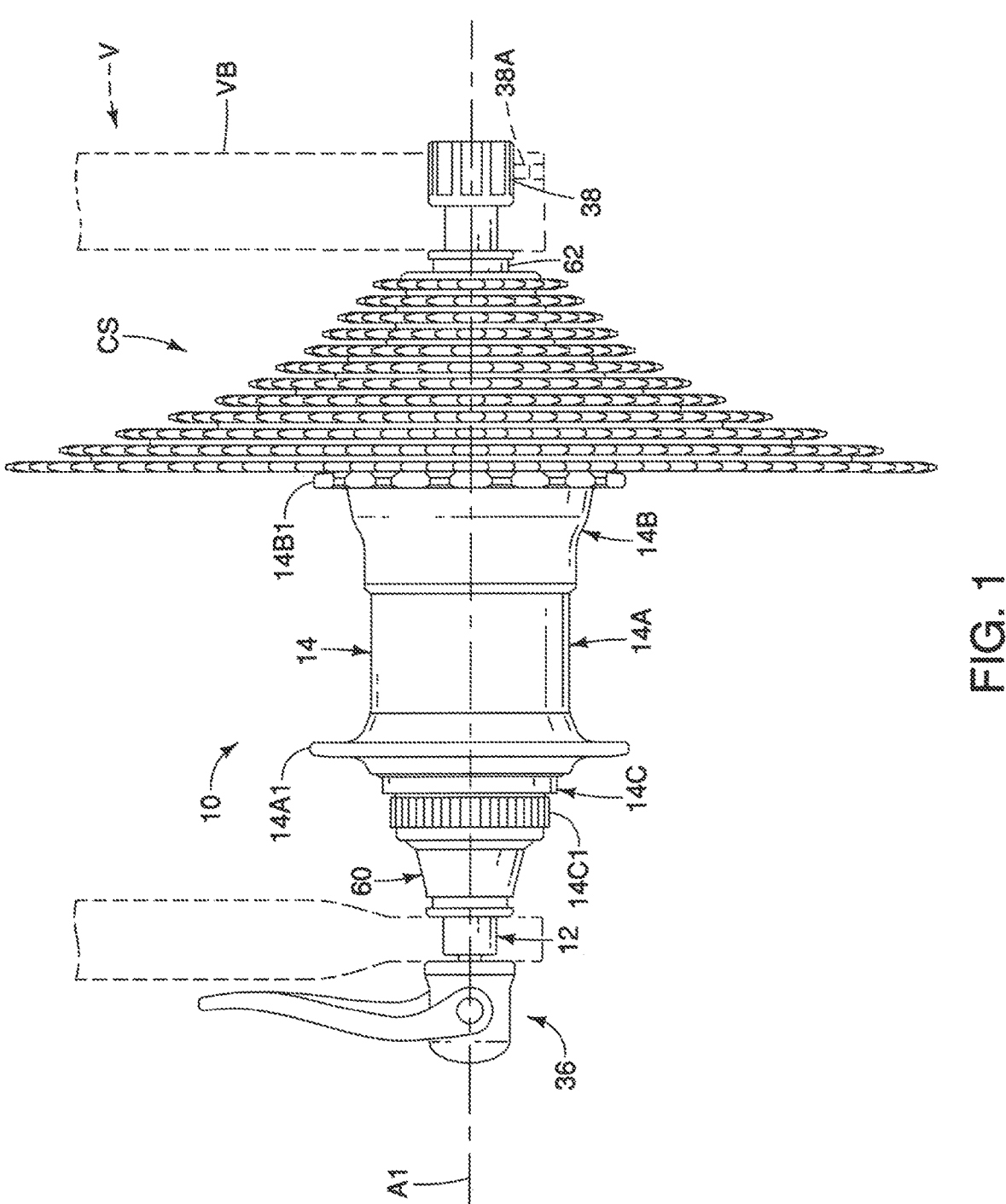
FIG. 1 is a rear elevational view of a rear portion of a human-powered vehicle (i.e., a bicycle) equipped with a rear hub having a rear hub thru-axle in accordance with a first embodiment.

Referring initially to FIG. 1, a rear portion of a human-powered vehicle V (i.e., a bicycle) is illustrated that is equipped with a rear hub 10 in accordance with an illustrated embodiment. Here, in the illustrated embodiment, the rear hub 10 is a bicycle rear hub. The rear hub 10 can be used with other human-powered vehicles as needed and/or desired. The rear hub 10 is configured to be removably mounted to a vehicle body VB as discussed below. The rear hub 10 is configured to support a plurality of rear sprockets CS. Alternatively, the rear hub 10 can be configured to support a single sprocket as needed and/or desired.

Figure 2:
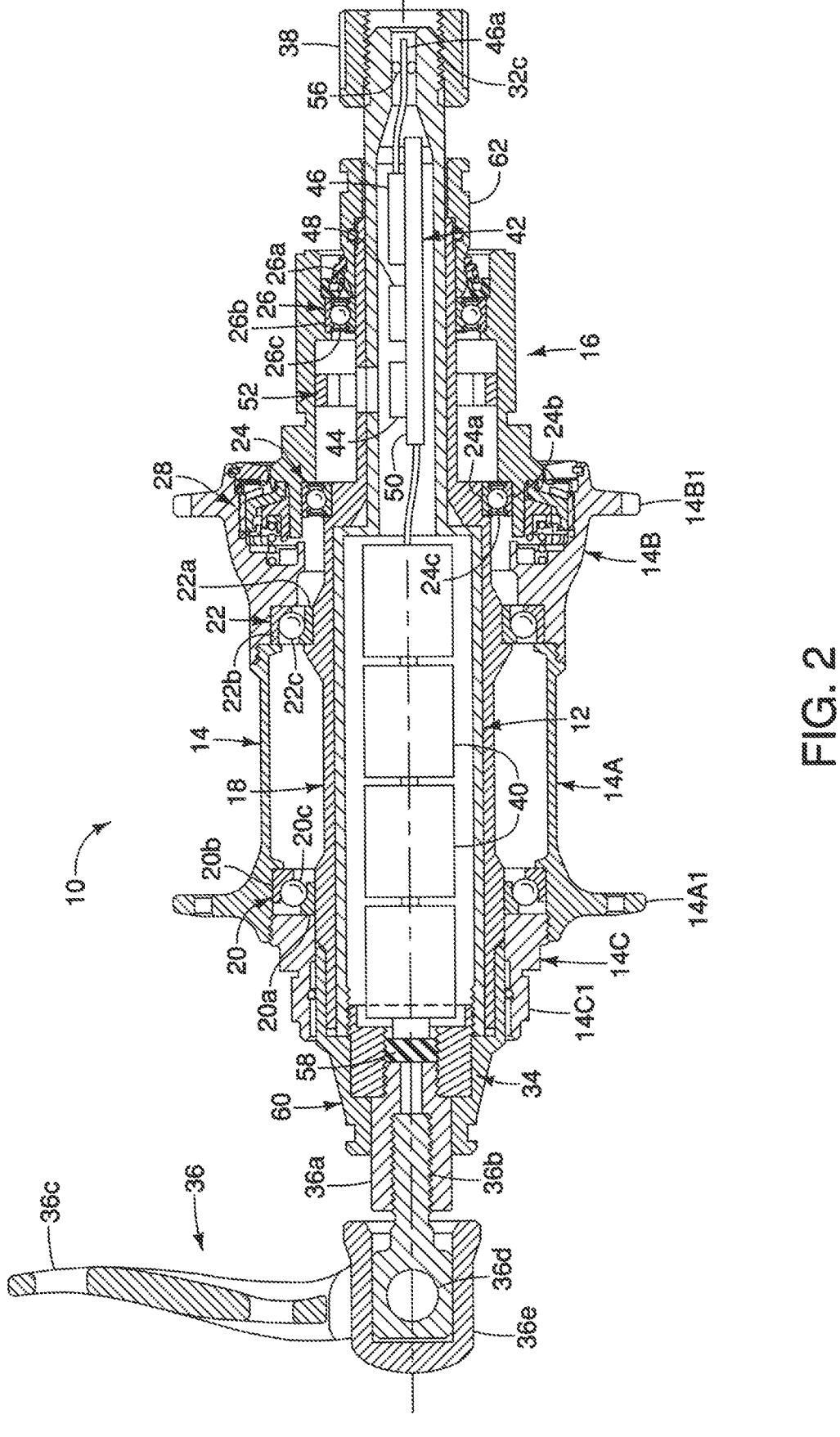
FIG. 2 is a longitudinal cross-sectional view of the rear hub illustrated in FIG. 1.

As seen in FIG. 2, the rear hub 10 basically comprises a rear hub thru-axle 12, a hub body 14 and a sprocket support body 16. The rear hub 10 has a rotational center axis A1. The rear hub thru-axle 12 is configured to be non-rotatably attached to the vehicle body VB. In this way, the rear hub thru-axle 12 is provided for the human powered vehicle V. Here, in the illustrated embodiment, the rear hub 10 further comprises an outer support axle 18 that is a tubular body that is interposed between the rear hub thru-axle 12 and the hub body 14. The outer support axle 18 is also interposed between the rear hub thru-axle 12 and the sprocket support body 16. The rear hub thru-axle 12 is removably disposed inside the outer support axle 18. The rear hub thru-axle 12 and the outer support axle 18 are configured to be non-rotatably coupled together. Optionally, the outer support axle 18 and the rear hub thru-axle 12 can be combined together as a one-piece member.

The hub body 14 is rotatably disposed around the rear hub thru-axle 12 to rotate around the rotational center axis A1. In particular, the hub body 14 is rotatably supported on the outer support axle 18 by a first hub body bearing 20 and a second hub body bearing 22. The first hub body bearing 20 rotatably supports one end of the hub body 14 with respect to the rotational center axis A1. The second hub body bearing 22 rotatably supports the other end of the hub body 14 with respect to the rotational center axis A1. The first hub body bearing 20 includes a first inner race 20a, a first outer race 20b and a plurality of first roller elements 20c. The first roller elements 20c are disposed between the first inner race 20a and the first outer race 20b. The second hub body bearing 22 includes a second inner race 22a, a second outer race 22b and a plurality of second roller elements 22c. The second roller elements 22c are disposed between the second inner race 22a and the second outer race 22b. The first hub body bearing 20 and the second hub body bearing 22 are angular contact ball bearings.

Angular contact ball bearings have inner and outer ring raceways that are displaced relative to each other in the direction of the bearing axis. In other words, angular contact bearings are designed to accommodate combined loads, i.e., simultaneously acting radial and axial loads. Further, angular contact roller bearings (i.e., tapered roller bearing) can be adopted instead of the angular contact ball bearings for the first hub body bearing 20 and the second hub body bearing 22. Angular contact roller bearings include cylindrical roller bearings and needle roller bearings. Alternatively, the first hub body bearing 20 and the second hub body bearing 22 can be radial ball bearings that support force in the direction perpendicular to the axis. Further, a radial roller bearing can be adopted instead of the angular contact roller bearings. Radial roller bearings include cylindrical roller bearings and needle roller bearings.

The sprocket support body 16 is a rigid member made of a suitable material such as a metallic material. The sprocket support body 16 is rotatably disposed around the rear hub thru-axle 12 to rotate around the rotational center axis A1. In particular, the sprocket support body 16 is rotatably supported around the rear hub thru-axle 12 by a first sprocket support bearing 24 and a second sprocket support bearing 26. The sprocket support body 16 is configured to non-rotatably support the rear sprockets CS. Here, the sprocket support body 16 has a plurality of external splines that are configured to engage the rear sprockets CS. In this way, the rear sprockets CS are non-rotatably coupled to the sprocket support body 16. However, the sprocket support body 16 is not limited to the illustrated embodiment. Alternatively, one or more of the rear sprockets CS can be integrally formed with the sprocket support body 16. In any case, the sprocket support body 16 and the rear sprockets CS are coupled together to rotate together in both the driving rotational direction and the non-driving rotational direction.

The first sprocket support bearing 24 and the second sprocket support bearing 26 are axially spaced apart along the rear hub thru-axle 12. The first sprocket support bearing 24 rotatably supports a first end of the sprocket support body 16. The second sprocket support bearing 26 rotatably supports a second end of the sprocket support body 16. The first sprocket support bearing 24 includes a first inner race 24a, a first outer race 24b and a plurality of first roller elements 24c. The first roller elements 24c are disposed between the first inner race 24a and the first outer race 24b. The second sprocket support bearing 26 includes a second inner race 26a, a second outer race 26b and a plurality of second roller elements 26c. The second roller elements 26c are disposed between the second inner race 26a and the second outer race 26b. Here, the first sprocket support bearing 24 and the second sprocket support bearing 26 are radial ball bearings.

Radial ball bearings support force in the direction perpendicular to the axis. Further, a radial roller bearing can be adopted instead of the radial ball bearing for one or both of the first sprocket support bearing 24 and the second sprocket support bearing 26. Radial roller bearings include cylindrical roller bearings and needle roller bearings. Alternatively, an angular contact ball bearing can be adopted instead of a radial ball bearing for one or both of the first sprocket support bearing 24 and the second sprocket support bearing 26.

The sprocket support body 16 is configured to transmit a driving force to the hub body 14 while rotating in a driving rotational direction around the rotational center axis A1. As explained below, the sprocket support body 16 does not transmit a driving force to the hub body 14 while rotating in a non-driving rotational direction around the rotational center axis A1. The non-driving rotational direction is opposite to the driving rotational direction with respect to the rotational center axis A1. The rotational center axis of the sprocket support body 26 is disposed concentrically with the rotational center axis A1 of the rear hub 10.

In the illustrated embodiment, the rear hub 10 further comprises a torque transmitting mechanism 28 disposed between the hub body 14 and the sprocket support body 16 to transmit a rotational force to the hub body 14 from the sprocket support body 16. The torque transmitting mechanism 28 forms a one-way clutch such that torque is transferred from the sprocket support body 16 to the hub body 14 in one direction. In this way, the rotational force imparted to the sprocket support body 16 from the rear sprockets CS during pedaling in the driving rotational direction is transmitted to hub body 14. During coasting, the sprocket support body 16 can be stationary and the hub body 14 can rotate in the driving rotational direction.

Figure 3:
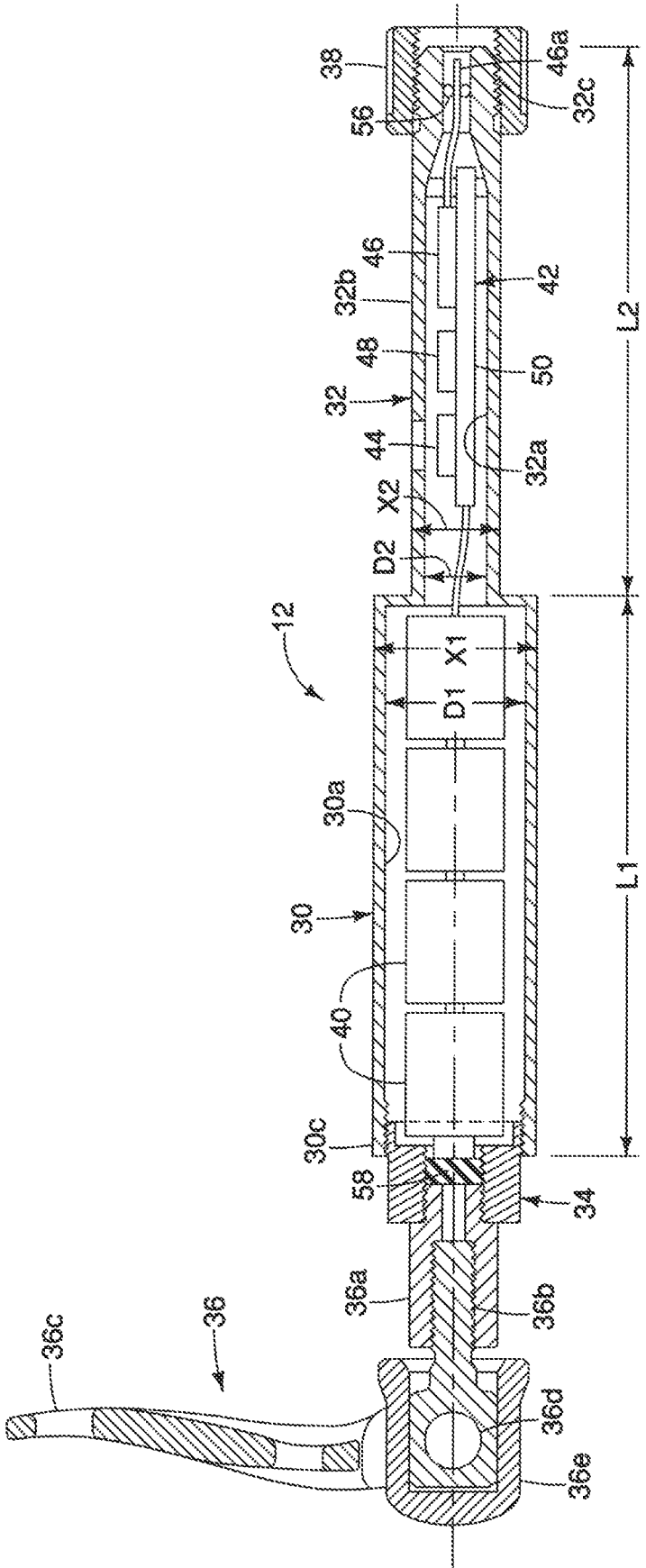
FIG. 3 is a longitudinal cross-sectional view of the rear hub thru-axle illustrated in FIGS. 1 and 2.

Referring to FIG. 3, the rear hub thru-axle 12 will now be described in more detail. The rear hub thru-axle 12 is a rigid member made of a suitable material such as a metallic material. The rear hub thru-axle 12 is a tubular member that is configured to receive various electrical parts as discussed below. Basically, the rear hub thru-axle 12 comprises a first axle portion 30 and a second axle portion 32. The first axle portion 30 is connected to the second axle portion 32 in an axial direction with respect to the rear hub thru-axle 12. Here, the first axle portion 30 and a second axle portion 32 are illustrated as a one-piece member. However, the first axle portion 30 and a second axle portion 32 can be made of several pieces that are coupled together. The hub body 14 is rotatably disposed around the first axle portion 30. The sprocket support body 16 is rotatably disposed around the second axle portion 32.

In the illustrated embodiment, the rear hub thru-axle 12 is a tubular member having a stepped shape. The first axle portion 30 has a first hollow interior passage 30a defining a first interior dimension D1. Also, the first axle portion 30 has a first exterior surface 30b defining a first exterior dimension X1. The second axle portion 32 has a second hollow interior passage 32a defining a second interior dimension D2. Also, the second axle portion 32 has a second exterior surface 32b defining a second exterior dimension X2. The first hollow interior passage 30a and the second hollow interior passage 32a are contiguous and form a single continuous passageway. The first interior dimension D1 of the first hollow interior passage 30a is larger than the second interior dimension D2 of the second hollow interior passage 32a. In this way, larger electrical components can be located in the first hollow interior passage 30a, while smaller electrical components can be located in the second hollow interior passage 32a. The first exterior dimension X1 is larger than the second exterior dimension X2.

In the illustrated embodiment, the first axle portion 30 has a first axle length L1. The second axle portion 32 has a second axle length L2. The first axle length L1 is larger than the second axle length L2. Thus, here, the interior area of the first hollow interior passage 30a is larger than the interior area of the second hollow interior passage 32a. In the illustrated embodiment, the second axle portion 32 extends a small amount inside the hub body 14. However, the second axle length L2 of the second axle portion 32 can be longer such that the second axle portion 32 extends further inside the hub body 14 as needed and/or desired.

As seen in FIG. 3, the rear hub thru-axle 12 further comprises an end cap 34 removably attached to an open end 30c of the first axle portion 30 on an opposite side from the second axle portion 32. Here, the end cap 34 is threaded into the open end 30c of the first axle portion 30. In this way, the interior area of the first hollow interior passage 30a and the interior area of the second hollow interior passage 32a can be easily accessed. However, the end cap 34 can be permanently attached to the open end 30c of the first axle portion 30, or removably attached using other attachment structures, as needed and/or desired.

The rear hub thru-axle 12 further comprises a frame attachment structure 36 attached to the first axle portion 30 at an opposite side from the second axle portion 32. On the other hand, the second axle portion 32 has an exterior thread 32c for threadedly engaging with a fixing nut, or a fork or a frame. In the illustrated embodiment, an axial length of the second exterior surface 32b is longer than an axial length of the exterior thread 32c. Here, a fixing nut 38 is threaded onto the exterior thread 32c of the second axle portion 32 for securing the second axle portion 32 to the vehicle body VB (for example, a bicycle frame in the illustrated embodiment). A set screw 38A is threaded into a threaded hole in the vehicle body VB to engage the fixing nut 38 so that the fixing nut 38 does not rotate relative to the vehicle body VB. Alternatively, the exterior thread 32c of the second axle portion 32 can be directly threaded into a female threaded hole of a fork or a frame In the illustrated embodiment, the frame attachment structure 36 is attached to the first axle portion 30 via the end cap 34, which is attached to the open end 30c of the first axle portion 30. In particular, the frame attachment structure 36 includes a frame engagement portion 36a and an attachment bolt 36b. Also, in the illustrated embodiment, the frame attachment structure 36 includes a lever 36c, a pin 36d and a cap 36e. Here, the frame engagement portion 36a is threadedly attached to the end cap 34. Alternatively, the end cap 34 and the frame engagement portion 36a can be a single piece, or permanently coupled together. The attachment bolt 36b is threadedly coupled to the frame engagement portion 36a. In this way, the threaded connection between the attachment bolt 36b and the frame engagement portion 36a allows a user to rotate the attachment bolt 36b to adjust an axial position of the frame engagement cap 36e relative to the vehicle body VB (the fork or the frame) during mounting of the rear hub 10 to the vehicle body VB (the fork or the frame). Here, the lever 36c is coupled to the attachment bolt 36b by the pin 36d.

In the illustrated embodiment, the first hollow interior passage 30a of the first axle portion 30 is configured to receive one of at least one battery 40 and at least one electronic component 42. The second hollow interior passage 32a of the second axle portion 32 is configured to receive the other of the at least one battery 40 and the at least one electronic component 42. Here, in the illustrated embodiment, the first hollow interior passage 30a of the first axle portion 30 is configured to receive a plurality of batteries 40. The second hollow interior passage 32a of the second axle portion 32 is configured to receive the at least one electronic component 42.

Here, the at least one electronic component 42 includes at least one of a sensor 44 and a wireless communication unit 46. Also, here, the at least one electronic component 42 includes an electronic controller 48. The sensor 44, the wireless communication unit 46 and the electronic controller 48 are provided on a circuit board 50. In the illustrated embodiment, the sensor 44 and the wireless communication unit 46 are arranged spaced apart from each other in an axial direction of the rear hub thru-axle 12, and the electronic controller 48 is disposed between the sensor 44 and the wireless communication unit 46. The circuit board 50 is electrically connected to the batteries 40 for receiving electric power. Thus, the batteries 40 supply electric power to the sensor 44, the wireless communication unit 46 and the electronic controller 48.

In the illustrated embodiment, the sensor 44 is a rotation detection sensor that is configured to detect rotation of the sprocket support body 16. However, the sensor 44 is not limited to a rotation detection sensor. The sensor 44 can include at least one of an acceleration sensor, a rotation detection sensor and a gyro sensor. The term "sensor" as used herein refers to a hardware device or instrument designed to detect the presence or absence of a particular event, object, substance, or a change in its environment, and to emit a signal in response. The term "sensor" as used herein does not include a human.

In the case where the sensor 44 is a rotation detection sensor, the sensor 44 is configured to detect a detected part 52 that is fixed to the sprocket support body 16 as seen in FIG. 2. Here, the sensor 44 includes a magnetic sensor, and the detected part 52 includes at least one magnets. Here, the detected part 52 includes a plurality of magnets formed as an annular member with alternating S-pole sections and N-pole sections. The detected part 52 is fixed to the inside wall of the sprocket support body 16. In this way, the sensor 44 can detect a rotational speed and a rotational direction of the sprocket support body 16. The electronic controller 48 is configured to receive a detection signal from the sensor 44, and output it to the wireless communication unit 46. As seen in FIG. 2, the outer support axle 18 and the second axle portion 32 includes openings that allows to the sensor 44 to detect the detected part 52. These openings in the outer support axle 18 and the second axle portion 32 can be filled with a signal transmissive material as needed and/or desired.

The wireless communication unit 46 is preferably a wireless transmitter that is configured to transmit the detection results of the sensor 44 to a remote wireless communication unit (a wireless receiver) of another component. The term "wireless communication unit" as used herein refers to hardware that includes a receiver, a transmitter, a transceiver, a transmitter-receiver, and contemplates any device or devices, separate or combined, capable of transmitting and/or receiving wireless communication signals. The wireless communication signals can be radio frequency (RF) signals, ultra-wide band communication signals, radio frequency identification (RFID), ANT+ communications, or Bluetooth® communications or any other type of signal suitable for short range wireless communications as understood in the human-powered vehicle field. The term "wireless communication unit" as used herein does not include a human. As mentioned above, the wireless communication unit 46 can be a one-way wireless communication device such as a transmitter. Here, the wireless communication unit 46 includes an antenna 46a that extends from the wireless communication unit 46 in the axial direction toward an open end of the rear hub thru-axle 12 to improve reception.

The electronic controller 48 includes a Central Processing Unit (CPU) or a Micro-Processing Unit (MPU). Preferably, the electronic controller 48 includes one or more processors and one or more memory devices. The memory devices store programs used by the electronic controller 48. Each memory device can be any computer storage device or any computer readable medium with the sole exception of a transitory propagating signal. For example, the memory device can be nonvolatile memory and volatile memory, and can include a ROM (Read Only Memory) device, a RAM (Random Access Memory) device, a hard disk, a flash drive, etc.

As seen in FIG. 2, the rear hub thru-axle 12 is provided with a sealing member 56 and a sealing member 58 for sealing the ends of the rear hub thru-axle 12. The sealing member 56 is disposed spaced apart from the circuit board 50 near an axial end of the second axle portion 32 of the thru-axle 12. In particular, the antenna 46a passes through the sealing member 56 such that the sealing member 56 is provided between the rear hub thru-axle 12 and the antenna 46a to prevent the ingress of contaminants into the second axle portion 32 of the rear hub thru-axle 12. The other end of the rear hub thru-axle 12 is provided with a sealing member 58 to prevent the ingress of contaminants into the first axle portion 30 of the rear hub thru-axle 12.

Also, as seen in FIG. 2, the rear hub 10 further comprises a first end piece 60 that is frictionally engaged with a first end of the outer support axle 18, and a second end piece 62 that is frictionally engaged with a second end of the outer support axle 18. The first end piece 60 and the second end piece 62 are configured to contact the vehicle body VB in a state where the rear hub 10 is mounted to the vehicle body VB.

Figure 4:
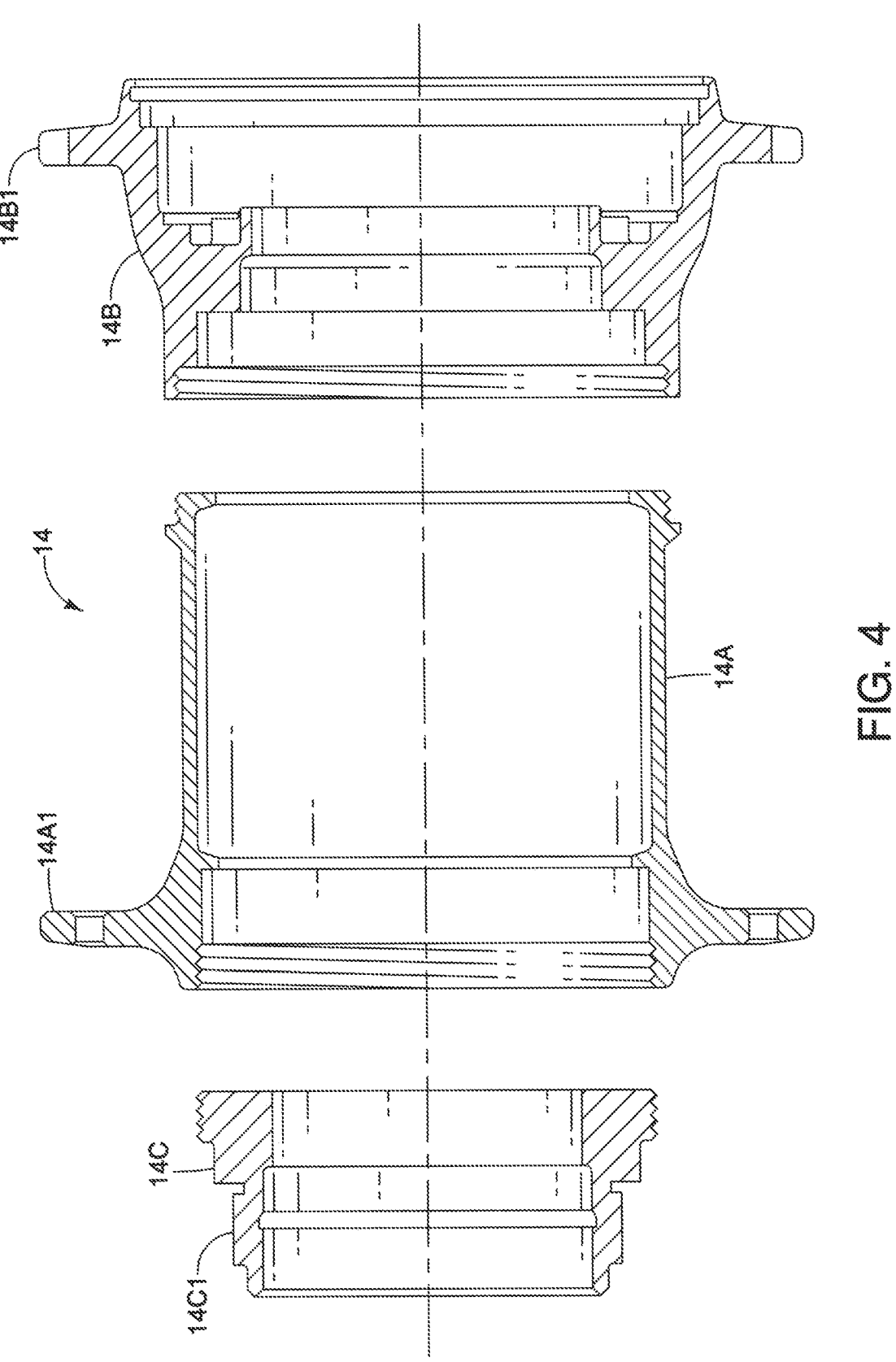
FIG. 4 is an exploded, longitudinal cross-sectional view of the hub body of the rear hub illustrated in FIGS. 1 and 2.

Referring now to FIG. 4, in the illustrated embodiment, the hub body 14 includes a first body portion 14A, a second body portion 14B and a third body portion 14C. Here, the second body portion 14B is threaded to one end of the first body portion 14A, and the third body portion 14C is threaded to the other end of the first body portion 14A. While the hub body 14 is illustrated as being constructed of three parts, it will be apparent that the hub body 14 can be constructed of as a one-piece member (a single part). Alternatively, the hub body 14 can be constructed of two parts, or more than three parts. In any case, the hub body 14 is constructed of a rigid material such as a metallic material or a non-metallic fiber reinforced material. Here, the hub body 14 includes a first spoke attachment flange 14A1 and a second spoke attachment flange 14B1. The first spoke attachment flange 14A1 is provided to the first body portion 14A. The second spoke attachment flange 14B1 is provided to the second body portion 14B. The third body portion 14C is provided with a brake rotor attachment structure 14C1.

Figure 5:
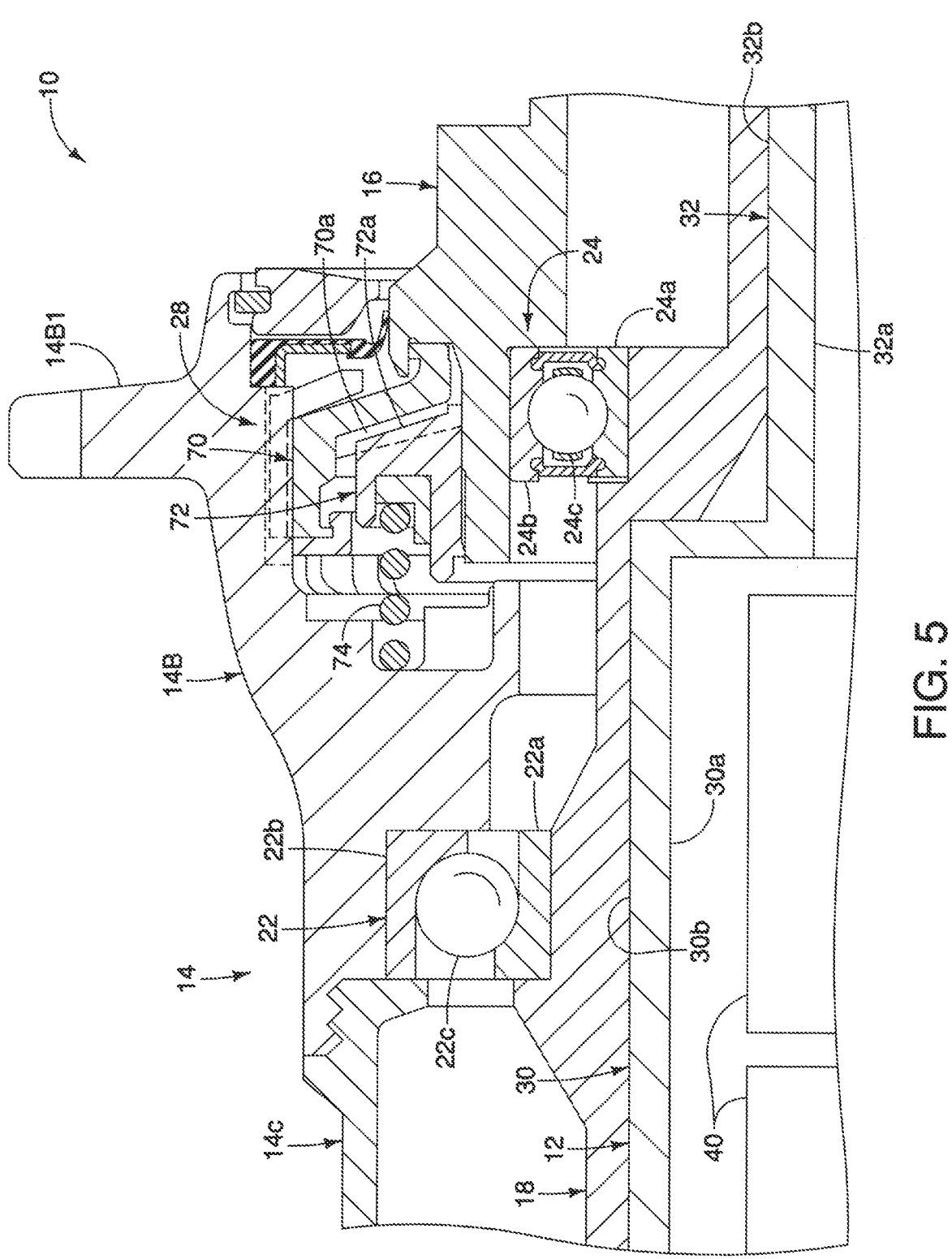
FIG. 5 is an enlarged cross sectional view of a portion of the hub illustrated in FIG. 2 showing a torque transmitting mechanism having a first ratchet member and a second ratchet member of a ratchet assembly in an engaged position for transmitting a driving force from the sprocket support body to the hub body.

Referring now to FIG. 5, the torque transmitting mechanism 28 comprises a first ratchet member 70 and a second ratchet member 72. The first ratchet member 70 is mounted to the hub body 14 to rotate therewith. The second ratchet member 72 is mounted to the sprocket support body 16 to rotate therewith. At least one of the first ratchet member 70 and the second ratchet member 72 is movable relative to the rear hub thru-axle 12 in an axial direction, which is parallel to the rotational center axis A1. In this embodiment, the second ratchet member 72 is movable relative to the rear hub thru-axle 12 and the sprocket support body 16 in the axial direction. The first ratchet member 70 is not movable relative to the rear hub thru-axle 12 and the hub shell 14 in the axial direction. A biasing element 74 is disposed between the hub body 14 and the second ratchet member 72 to bias the second ratchet member 72 into torque transmitting engagement with the first ratchet member 70. The first ratchet member 70 includes a plurality of first ratchet teeth 70a that face in the axially direction. The second ratchet member 72 includes a plurality of second ratchet teeth 72a that face in the axially direction. The first ratchet teeth 70a engage the second ratchet teeth 72a to transmit a rotational force to the hub body 14 from the sprocket support body 16 when the sprocket support body 16 is rotated in a forward driving direction. On the other hand, the first ratchet teeth 70a and the second ratchet teeth 72a rotate relative to each other when the sprocket support body 16 is rotated in a non-driving direction or stopped.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (for example, bicycle) in an upright, riding position and equipped with the rear hub thru-axle. Accordingly, these directional terms, as utilized to describe the rear hub thru-axle should be interpreted relative to a human-powered vehicle (for example, bicycle) in an upright riding position on a horizontal surface and that is equipped with the rear hub thru-axle. The terms "left" and "right" are used to indicate the "right" when referencing from the right side as viewed from the rear of the human-powered vehicle (for example, bicycle), and the "left" when referencing from the left side as viewed from the rear of the human-powered vehicle (for example, bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present disclosure, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rear hub thru-axle for a human powered vehicle, the rear hub thru-axle comprising:
    a first axle portion having a first hollow interior passage defining a first interior diameter; and
    a second axle portion having a second hollow interior passage defining a second interior diameter,
    the first axle portion being connected to the second axle portion in an axial direction with respect to the rear hub thru-axle,
    the first interior diameter of the first hollow interior passage being larger than the second interior diameter of the second hollow interior passage,
    the first hollow interior passage of the first axle portion being configured to receive a battery, and
    the second hollow interior passage of the second axle portion being configured to receive a circuit board on which a wireless communication unit is mounted,
    the first axle portion having a first exterior surface defining a first exterior diameter and the second axle portion having a second exterior surface defining a second exterior diameter,
    the first exterior diameter being larger than the second exterior diameter,
    the second axle portion having an exterior thread for threadedly engaging with a fixing nut, or a fork or a frame,
    the second exterior surface being disposed between the first exterior surface and the exterior thread, and
    an axial length of the second exterior surface being longer than an axial length of the exterior thread.

2. The rear hub thru-axle according to claim 1, wherein the first axle portion has a first axle length, the second axle portion has a second axle length, and the first axle length is larger than the second axle length.

3. The rear hub thru-axle according to claim 1, further comprising
    an end cap removably attached to an open end of the first axle portion on an opposite side from the second axle portion.

4. The rear hub thru-axle according to claim 1, further comprising
    a frame attachment structure attached to the first axle portion at an opposite side from the second axle portion.

5. The rear hub thru-axle according to claim 4, wherein the frame attachment structure includes a frame engagement portion and an attachment bolt threadedly coupled to the frame engagement portion.

6. A rear hub comprising the rear hub thru-axle according to claim 1, and further comprising:
    a hub body rotatably disposed around the first axle portion; and
    a sprocket support body rotatably disposed around the second axle portion.

7. The rear hub according to claim 6, wherein at least a portion of the second exterior surface extends to a position inside the hub body.

8. The rear hub according to claim 7, wherein the rear hub thru-axle has a stepped shape between the first exterior surface and the second exterior surface and the stepped shape is disposed inside the hub body.

9. The rear hub thru-axle according to claim 1, wherein a sensor is mounted on the circuit board.

10. The rear hub thru-axle according to claim 9, wherein the sensor and the wireless communication unit are spaced apart from each other in the axial direction.

11. The rear hub thru-axle according to claim 10, wherein an electronic controller is mounted to the circuit board between the sensor and the wireless communication unit.

12. The rear hub thru-axle according to claim 1, wherein an antenna protrudes from the wireless communication unit.

13. The rear hub thru-axle according to claim 12, wherein the antenna extends along the axial direction from the wireless communication unit.

14. The rear hub thru-axle according to claim 1, wherein the rear hub thru-axle has a stepped shape between the first exterior surface and the second exterior surface and the second exterior surface spans from the first exterior surface to the exterior thread.

15. A rear hub thru-axle for a human powered vehicle, the rear hub thru-axle comprising:
    a first axle portion having a first hollow interior passage defining a first interior diameter; and
    a second axle portion having a second hollow interior passage defining a second interior diameter,
    the first axle portion being connected to the second axle portion in an axial direction with respect to the rear hub thru-axle,
    the first interior diameter of the first hollow interior passage being larger than the second interior diameter of the second hollow interior passage,
    the first hollow interior passage of the first axle portion being configured to receive a battery, and
    the second hollow interior passage of the second axle portion being configured to receive a circuit board on which a wireless communication unit is mounted,
    an antenna protruding from the wireless communication unit, the antenna extending along the axial direction from the wireless communication unit,
    the antenna engaging with a sealing member provided inside the rear hub thru-axle.

16. The rear hub thru-axle according to claim 15, wherein the sealing member is spaced apart from the circuit board toward an axial end of the rear hub thru-axle in the axial direction.

* * * * *